March 1, 1949.　　　　K. WILLIAMS　　　　2,463,344
ONE-WAY RATCHET BRAKE

Filed July 29, 1946　　　　　　　　　　2 Sheets-Sheet 1

Inventor:
Keith Williams.
By George I. Haight
Atty.

March 1, 1949.　　　　　K. WILLIAMS　　　　　2,463,344
ONE-WAY RATCHET BRAKE
Filed July 29, 1946　　　　　　　　　　　2 Sheets-Sheet 2

Inventor:
Keith Williams.
By George I. Haight
Atty.

Patented Mar. 1, 1949

2,463,344

UNITED STATES PATENT OFFICE 2,463,344

ONE-WAY RATCHET BRAKE

Keith Williams, Buffalo, N. Y.

Application July 29, 1946, Serial No. 686,816

9 Claims. (Cl. 188—81.1)

This invention relates to improvements in one way ratchet brakes.

One object of the invention is to provide a hand brake mechanism of the ratchet type, especially adapted for railway cars, comprising a ratchet wheel and cooperating dogs for locking the mechanism against movement in releasing direction, wherein the dogs have staggered engagement with the ratchet wheel to provide for relatively fine ratcheting adjustment in applying the brakes, thus preventing excessive backing-up of the ratchet wheel before it is locked against movement in releasing direction, thereby greatly increasing the effectiveness of the brake mechanism.

A further and more specific object of the invention is to provide a mechanism, as set forth in the preceding paragraph, wherein the locking dogs which have staggered engagement with the ratchet wheel are three in number, thereby permitting locking of the ratchet wheel at intervals of movement thereof corresponding to one-third of the amount of rotation required to advance the same one tooth.

Still another object of the invention is to provide a hand brake mechanism of the rotary chain-winding type including the usual ratchet wheel and cooperating locking means, wherein the locking means consists of a set of three dogs having staggered engagement with the ratchet wheel, and wherein lever means is provided for positively engaging the three locking dogs with the teeth of the ratchet wheel and simultaneously withdrawing the same from engagement with said wheel.

Other objects of the invention will more clearly appear from the description and claims hereinafter following.

In the accompanying drawings, forming a part of this specification,

Figure 1:
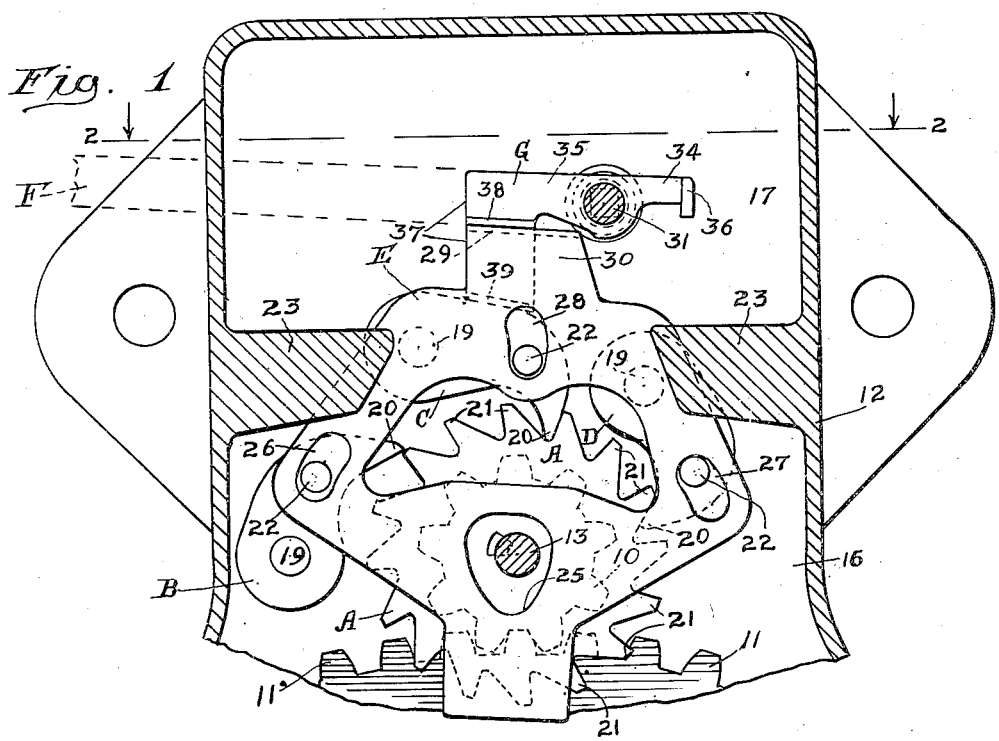
Fig. 1 is a vertical sectional view through the upper portion of a brake mechanism of the power-multiplying, gear-driven type, illustrating my improvements in connection therewith, said section corresponding substantially to the line 1—1 of Fig. 2.

As illustrated in the drawings, my improvements are employed in connection with a well known type of power-multiplying gear brake employing the usual drum, not shown, on which the chain is wound, the drum being rotated by a driving pinion 10 actuated by the hand wheel of the brakes, not shown, and meshing with a gear 11 which is rotatable with the drum. The parts of the brake mechanism are contained in the usual housing, the upper portion only of which is shown in the drawings and is indicated by 12.

My improved hand brake mechanism, as shown in the drawings, includes broadly a ratchet wheel A rotatable with the driving pinion of the power-multiplying gear brake; a set of three locking dogs B, C, and D, cooperating with the ratchet wheel; a cam plate E forming a part of means for engaging the dogs with and disengaging the same from the ratchet wheel; an actuating lever F; and a trip element G operated by the lever F.

The ratchet wheel A, which is of a well known type, is fixed to a shaft 13 which also has the pinion 10 fixed thereto, and is actuated by the usual hand wheel, not shown, which is located on this shaft exteriorly of the housing. The shaft 13 has its front and rear ends journaled in suitable bearings in the front and rear walls 14 and 15, and an intermediate partition wall 16 of the housing 12. Above the ratchet wheel A, the rear wall 15 of the housing is inwardly offset, as shown, the vertical wall section of said offset portion being indicated by 17. The wall 17 is in alignment with the partition wall 16, the latter, in effect, forming a continuation thereof. A relatively narrow chamber 18 is thus provided at the top of the housing.

The locking dogs B, C, and D, are arranged in the chamber 18 above and at opposite sides of the ratchet wheel, being swingingly supported on pivot pins 19—19—19 extending from the wall 17 and its continuation 16. The three dogs B, C, and D, are of similar design, each dog being pivoted at its inner end and having a tooth 20 at its outer end cooperating with the teeth 21 of the ratchet wheel A. Inwardly of the toothed end thereof, each dog has a guide pin or lug 22 laterally projecting therefrom at the forward side thereof.

The cam plate E is vertically disposed and is guided for vertical movement at the upper end portion thereof between relatively heavy horizontal ribs 23—23 on the front wall 14 of the housing and the outer sides of the dogs B, C, and D, and at its lower end between an inwardly projecting boss 24 on the wall 14 surrounding the bearing opening for the shaft 13 and the outer side of the ratchet wheel A. At the lower end thereof, the plate E is provided with a relatively large opening 25 through which the shaft 13 extends. The opening 25 is of such a size as to provide sufficient clearance to permit the required operating movement of the plate E without contact of said plate with the shaft. The plate E is further provided with cam slots 26 and 27 at opposite sides thereof into which the guide pins or lugs 22—22 of the dogs B and D extend and in which they have sliding movement. Above the slots 26 and 27, the plate E is provided with a guide slot 28 which slidingly accommodates the pin or lug 22 of the dog C, said slot being located approximately midway of said plate. At the upper extremity thereof, the plate E has a laterally projecting, horizontal flange or lug 29, for a purpose hereinafter pointed out, the lug 29 being formed on an upstanding section 30 of said plate.

Figure 2:
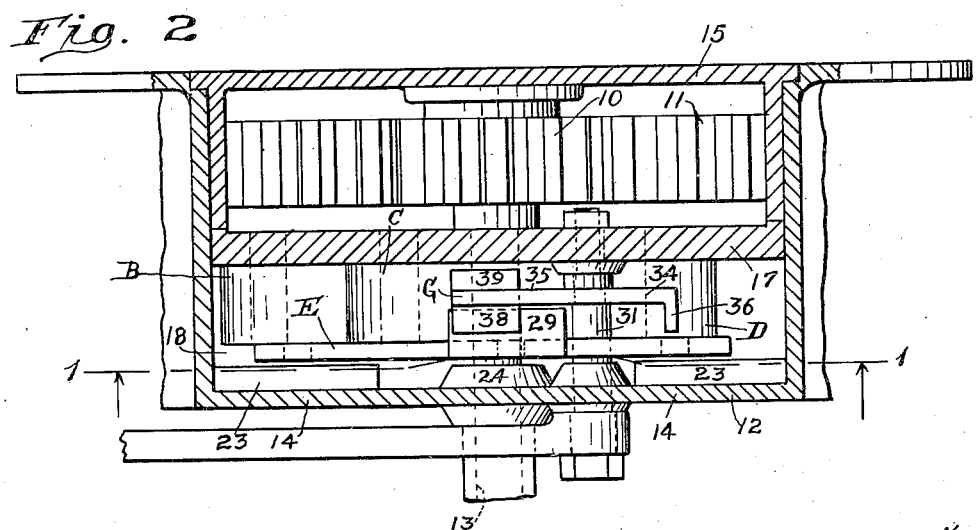
Fig. 2 is a horizontal sectional view, corresponding substantially to the line 2—2 of Figs. 1 and 4.
Figure 3:
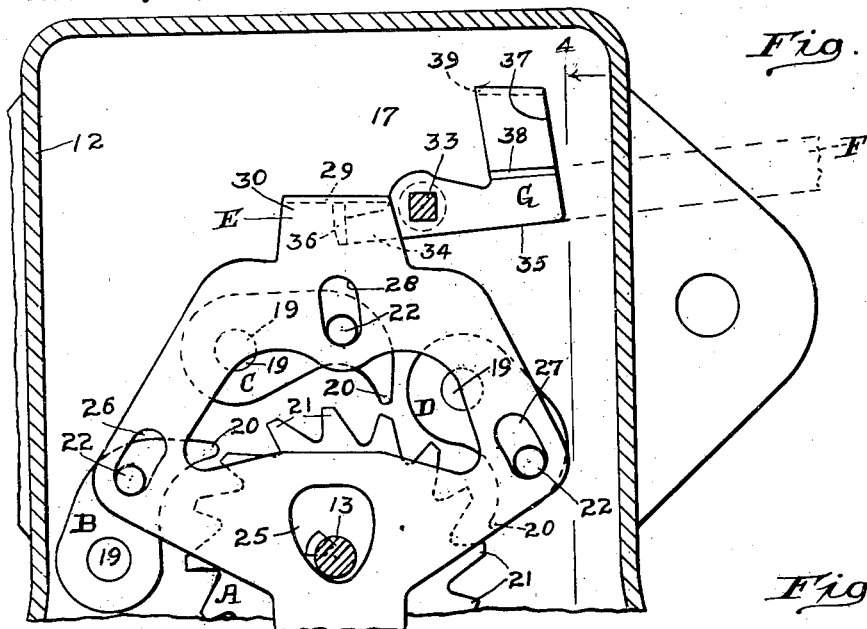
Fig. 3 is a view similar to Fig. 1 with certain parts omitted and showing the mechanism in the position assumed when the locking dogs are disengaged from the ratchet wheel.
Figure 4:
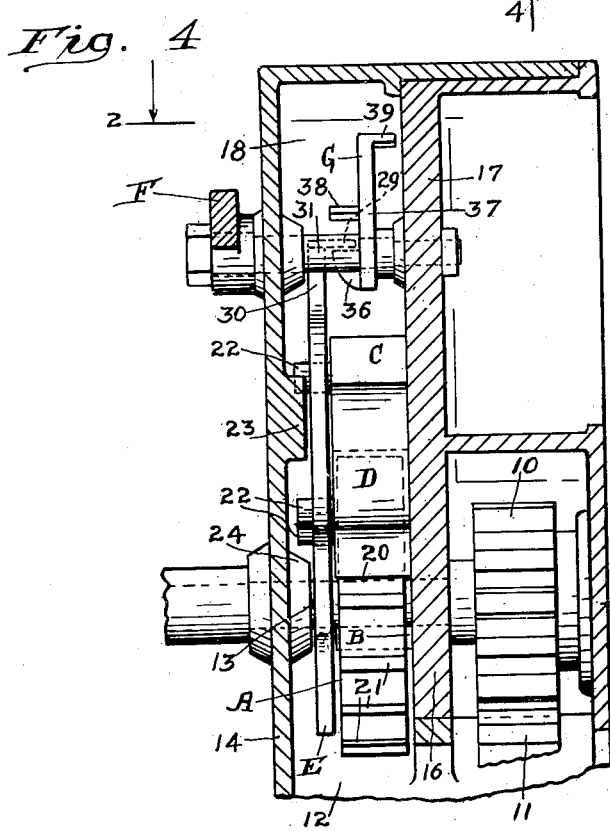
Fig. 4 is a vertical sectional view, corresponding substantially to the line 4—4 of Fig. 3.
Figure 5:
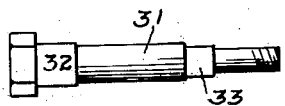
Fig. 5 is an elevational view of the shaft of the dog-actuating lever member.
Figure 6:
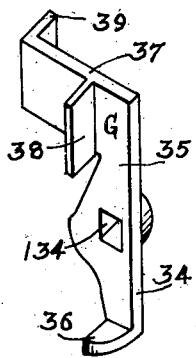
Fig. 6 is a detail perspective view of the trip element of the dog-actuating lever member.

The trip element G is fixed to the inner end of short shaft 31 which extends from the lower end of the lever F. The shaft 31 is fixed to the lever F to be rotated thereby, the same being provided with a square portion 32 fitting a square opening provided in the lever. As shown in Figs. 1, 2, and 3, the shaft 31 is located to one side of the vertical central axis of the mechanism adjacent to the upper end of the cam plate E and has its opposite ends journaled in suitable bearings provided in the wall members 14 and 17 of the housing. The trip element G is rotatable in unison with the shaft 31, the latter being preferably provided with a square section 33 fitting a square opening 134 of the trip element.

The trip element G presents a pair of arms 34 and 35, which extend in radially opposite directions from the shaft 31, the arm 34 being provided with a laterally projecting lug 36 at its outer end adapted to engage beneath the lug 29 of the cam plate E to lift the latter. The arm 35 has a right angular offset extension 37 at its outer end. Between its end and the extension 37, the arm 35 is provided with a transversely extending, laterally projecting rib 38, which is on the same side of the trip element as the lug 36 and extends in a plane at right angles to the plane of the latter. When the trip element is swung to the position shown in Fig. 1, the rib 38 thereof engages the lug 29 of the cam plate to depress the latter. At the extremity thereof, the offset extension 37 of the arm 35 is provided with a laterally projecting flange or presser foot 39, which is parallel to the rib 38, but located on the opposite side of the trip element. The flange or presser foot 39 is adapted to engage the top side of the dog C to depress the latter when the trip element is moved to the position shown in Fig. 1.

The operation of my improved hand brake mechanism is as follows: In applying the brakes, the ratchet wheel is rotated in clockwise direction, as viewed in Fig. 1, the dogs B, C, and D, ratcheting over the teeth of the same, being yieldingly held in engagement with the teeth of said wheel by the action of gravity on the dogs and the added weight of the lever F, which acting through the trip element G and the cam plate E urges the dogs toward the ratchet wheel by camming engagement of said plate with the lugs 22—22 of the dogs B and D and pressure of the foot 39 of the trip element G on the dog C. As will be evident, alternating engagement of the dogs with the ratchet wheel is permitted by the rocking action of the cam plate E.

To release the brakes, the lever F is swung to the right from the position shown in Fig. 1 toward the position shown in Fig. 3, thus engaging the lug 36 of the trip element beneath the flange 29 of the cam plate. With the lever resting in this position, slight rotation of the hand wheel and the ratchet wheel A in chain-tightening direction relieves the pressure on the particular dog which is in full locking engagement with one of the teeth of the ratchet wheel, thereby freeing the dog and permitting the lever F, in its overbalanced condition, to raise the cam plate E and through the latter lift the dogs B, C, and D, free of the ratchet wheel, thus automatically disengaging the dogs, as illustrated in Fig. 3.

The dogs B, C, and D may also be forcibly disengaged from the ratchet wheel by manually swinging the lever F directly to the position shown in Fig. 3, without slight tightening of the brakes.

To re-engage the dogs with the ratchet wheel, the lever F is swung from the position shown in Fig. 3 to the left to the approximate position shown in Fig. 1, thereby depressing the plate E and camming the dogs B and D toward the ratchet wheel and also forcing the dog C toward said wheel through engagement of the foot 39 of the trip element with said dog. With the ratchet wheel in the position shown in Fig. 1, the dog C will thus be fully engaged with the cooperating tooth of the wheel and the dog D partially engaged, while the dog B rests on top of the tooth cooperating therewith. The arrangement of the parts is such that at least one of the dogs will be forced into engagement with a tooth of the ratchet wheel regardless of the position of the wheel. In other words, when the tooth of the dog B rides on top of a tooth of the ratchet wheel, the teeth of the dogs C and D will engage between teeth of the ratchet wheel to hold the latter against rotation, the dog C being fully engaged, as shown in Fig. 1; when the dog D rides on top of a tooth, the dogs B and C will engage between the teeth of said wheel; and when the dog C rides on top of a tooth, the dogs B and D will engage between the teeth of said wheel.

I claim:

1. In a hand brake mechanism, the combination with a member adapted to be rotated to effect tightening of the brake; of a ratchet wheel rotatable with said member; a set of three locking dogs cooperating with said ratchet wheel, said dogs having staggered engagement with the teeth of the ratchet wheel; a swinging operating lever; and means operatively connecting said lever with said dogs for positively transmitting movement from said lever to said set of dogs for throwing the same into and out of engagement with the ratchet wheel by swinging movement of said lever in reverse directions.

2. In a hand brake mechanism, the combination with a member adapted to be rotated to effect tightening of the brake; of a ratchet wheel rotatable with said member, said wheel having a plurality of ratchet teeth; a set of three pivoted dogs having staggered engagement with said ratchet wheel; a swinging operating lever; and means connected to said dogs and actuated by said operating lever when swung in one direction for positively engaging each of said dogs with the ratchet wheel.

3. In a hand brake mechanism, the combination with a member adapted to be rotated to effect tightening of the brake; of a ratchet wheel rotatable with said member; a set of three dogs cooperating with said ratchet wheel, said dogs having staggered engagement with said ratchet wheel; a swinging operating lever, said lever having shouldered engagement with one of said dogs to force the same into engagement with said ratchet wheel when the lever is swung in one direction; and means connecting said lever to the two remaining dogs for throwing the latter into engagement with the ratchet wheel when the lever is swung in said direction.

4. In a hand brake mechanism, the combination with a member adapted to be rotated to effect tightening of the brake; of a ratchet wheel rotatable with said member; a set of three dogs engageable with said ratchet wheel, said dogs having staggered engagement with said wheel; a swinging operating lever; a slide engaged by said operating lever and movable in reverse directions by swinging movement of said lever; means operatively connecting said slide to all of said dogs for lifting the same out of engagement with the ratchet wheel when the slide is moved in one direction by said lever; means on said slide having camming engagement with two dogs of said set when the slide is moved in a reverse direction by said lever to engage said two dogs with the ratchet wheel; and additional means on said lever having shouldered engagement with the remaining dog of said set for forcing said dog into engagement with the ratchet wheel when said lever is swung to move said slide in the direction last named.

5. In a hand brake mechanism, the combination with a member adapted to be rotated to effect tightening of the brake; of a ratchet wheel rotatable with said member, said wheel having a plurality of ratchet teeth; a set of three pivoted dogs cooperating with said ratchet wheel, said dogs having staggered engagement with said wheel; a swinging lever; means on said lever engageable with one of said dogs for forcing the latter toward said ratchet wheel when the lever is swung in one direction; and link means connecting said lever to said two remaining dogs of said set for forcing the latter toward said ratchet wheel when the lever is swung in the direction last named.

6. In a hand brake mechanism, the combination with a member adapted to be rotated to effect tightening of the brake; of a ratchet wheel rotatable with said member, said wheel having a plurality of ratchet teeth; a set of three locking dogs having staggered engagement with the teeth of said ratchet wheel; a slide movable toward and away from said ratchet wheel; a reversely swingable actuating lever, said lever when swung in one direction engaging one of said dogs of said set to force the same against the ratchet wheel and having shouldered engagement with said slide to move the same toward said ratchet wheel, said lever when swung in a reverse direction having shouldered engagement with said slide to move the same away from said ratchet wheel; and cam means on said slide engageable with the two remaining dogs of said set when said slide is moved toward said ratchet wheel for forcing said two dogs against the ratchet wheel, said slide when moved away from said ratchet wheel having shouldered engagement with all three of said dogs for moving the same out of engagement with the ratchet wheel.

7. In a hand brake mechanism, the combination with a member adapted to be rotated to effect tightening of the brake; of a ratchet wheel rotatable with said member, said wheel having a plurality of ratchet teeth; a set of three pivoted locking dogs engageable with said ratchet wheel; a swinging actuating lever; a rotary trip element actuated by said lever, said trip element having a radially extending arm provided with a presser foot engageable with one of said dogs of said set to force the same toward said ratchet wheel, said trip element having a second radial arm diametrically opposite to the first named arm; a slide movable toward and away from said ratchet wheel, said slide being in the path of movement of and engageable by said first and second named arms respectively for moving the slide toward and away from the ratchet wheel; and cam means on said slide engageable with the two remaining dogs of said set when the slide is moved toward said ratchet wheel for forcing said two dogs toward the ratchet wheel, said slide having shouldered engagement with all three of the dogs of said set when moved away from said wheel for disengaging the dogs from said wheel.

8. In a hand brake mechanism, the combination with a member adapted to be rotated to effect tightening of the brake; of a ratchet wheel rotatable with said member; a set of three pivoted dogs engageable with said ratchet wheel; a pivoted actuating lever swingable in reverse directions; a slide movable toward and away from said ratchet wheel by said lever, said slide having lost motion connection with said dogs, said slide having shouldered engagement with said dogs to move all of the same out of engagement with said ratchet wheel when the lever is swung to move the slide away from the ratchet wheel; means on said slide having camming engagement with two of said dogs of said set when the slide is moved toward said ratchet wheel for forcing said two dogs toward the ratchet wheel; and a foot on said lever engageable with the remaining dog of said set to force the latter toward the ratchet wheel when the lever is swung to move said slide in the direction last named.

9. In a hand brake mechanism, the combination with a member adapted to be rotated to effect tightening of the brakes; of a ratchet wheel rotatable with said member; a movable locking dog engageable with said wheel; a pair of additional movable locking dogs engageable with said wheel; a vertically disposed actuating member movable toward and away from said ratchet wheel, said actuating member having lifting engagement with all of said dogs when moved away from said wheel to disengage said dogs from said wheel, said actuating member forcing said additional dogs into engagement with said ratchet wheel when moved toward said wheel; and a rotary trip element having a pair of circumferentially spaced arms respectively engageable with said actuating member for moving the same toward and away from the ratchet wheel, said arm for moving the actuating member toward the ratchet wheel having a presser foot engageable with said first named dog to force the same into engagement with the ratchet wheel.

KEITH WILLIAMS.

REFERENCES CITED

The following references are of record in the file of this patent:

UNITED STATES PATENTS

| Number | Name | Date |
| --- | --- | --- |
| 300,216 | Chisholm | June 10, 1884 |